INVENTOR
William W. Billings
BY
ATTORNEY

United States Patent Office 3,480,834
Patented Nov. 25, 1969

3,480,834
MINIATURE OVERVOLTAGE PROTECTION CIRCUIT HAVING SEPARATE VOLTAGE SENSING AND TIME DELAY CIRCUITS
William W. Billings, Lima, Ohio, assignor to Westinghouse Electric Corporation, Pittsburgh, Pa., a corporation of Pennsylvania
Filed Sept. 19, 1966, Ser. No. 580,517
Int. Cl. H02h 3/28
U.S. Cl. 317—31                            1 Claim

ABSTRACT OF THE DISCLOSURE

A solid state circuit arrangement for sensing an overvoltage condition comprising a sensing circuit and a time delay circuit, the voltage to be sensed being applied directly and simultaneously to said circuits, said circuits being connected together in a manner to effect independent adjustment and calibration for improved circuit flexibility and adaptation.

---

The present invention relates to overvoltage sensing circuits, and particularly to such circuits that can utilize static microminiature components such as molecular and thin film logic elements.

While the circuits of the present invention are not necessarily restricted in their usefulness to any particular application, they are especially suitable for use with alternating current power generating systems in air and space vehicles where size and weight must be kept to a minimum and where a high degree of reliability is required over a wide range of environmental conditions such as temperature and humidity.

Besides the problems of size, weight and reliability, other problems are encountered with present overvoltage protection circuits. For example, meeting overvoltage protection limits prescribed by users of the circuits is a current problem. A highly flexible circuit is needed in order to meet these limits that are required and subject to change. Other problems are presented by the new requirement of a maximum of 5 seconds time delay at minimum pickup (circuit operation), and nuisance tripping as a result of a succession of minor overvoltage transients.

One frequently used overvoltage protection circuit includes a three-phase transformer and rectifier means for sensing the average voltage of a three-phase line. A combined sensing and time delay circuit is commonly fed from the output of the rectifiers. A high voltage Zener diode is directly connected between a voltage sensing level adjustment means and a time delay adjustment means for sensing the level of rectified voltage representative of voltage conditions in the three-phase line. Obviously, no significant degree of circuit miniaturization and weight reduction is realized with the use of sensing transformers. Secondly, the square knee (voltage-current characteristic) of high voltage Zener diodes is critical to the performance of the circuits presently being used in overvoltage protection arrangements.

Another disadvantage with present overvoltage protection circuits is the inherently lengthy discharge time constant of the C components in the time delay circuit that cannot be eliminated as a practical matter. The circuits are further plagued with lengthy time delays at minimum voltage sensing level because the voltage operating level and time delay portions of the circuit are combined. The slope and positioning of the volt-time characteristic of the circuit are thus dependent on its minimum voltage level pickup. This interdependence further complicates circuit calibration since the sensing level and time delay adjustments are interacting. Also parameter drifts in one circuit portion affect the other.

The present disclosure describes a novel overvoltage protection circuit that overcomes the above mentioned problems with presently used overvoltage circuits. Briefly, the overvoltage circuit herein disclosed comprises three line voltage rectifiers (for a three-phase system) feeding separate voltage sensing and time delay circuits which perform their respective operations substantially independently of each other. With no overvoltage condition present, the sensing circuit functions to clamp a timing capacitor in the time delay circuit to ground potential. When an overvoltage condition occurs, a low voltage Zener diode in the sensing circuit breaks down thereby causing the time-delay capacitor to become unclamped. The unclamped capacitor receives the overvoltage through a second Zener diode and charges at a rate determined by the magnitude of the overvoltage condition. A voltage detector senses the capacitor voltage and produces an output voltage signal which is the overvoltage fault indication signal. Each of the circuits (voltage sensing and time delay) is provided with a variable resistance for independent calibration and adjustment. The voltage detector can be an integrated circuit in miniature package form such as shown and described in application Ser. No. 457,445, filed May 20, 1965 by the present inventor and assigned to the present assignee, and now U.S. Patent 3,365,586 issued Jan. 23, 1968. Such circuits are highly reliable, light in weight and low in power utilization. The voltage sensing portion of the circuit can use transistors, and with simple line voltage rectifiers and no sensing transformer, the complete circuit can be made extremely small yet remain highly reliable and therefore well suited for use in aircraft and space vehicles. Further, the independent functioning of the voltage pickup and time delay circuits provides the overall circuit with a high degree of flexibility to meet performance limits requirements, easier circuit calibration, and limited time delay at minimum voltage level sensing. Nuisance tripping by minor overvoltage transients is precluded by the fast time delay circuit reset provided by the almost instantaneous discharge of the timing capacitor by the clamping circuit.

Accordingly, an object of the invention is to provide a novel and improved overvoltage sensing and protecting circuit especially susceptible to solid state miniaturization for packaging in a small volume.

Another object of the invention is to provide a stable and reliable overvoltage protection circuit that is accurately calibrated and easily adaptable to the volt-time performance characteristic limits of different systems.

Yet another object of the invention is to provide a novel overvoltage protection circuit having a limited time delay at minimum levels of pickup voltage.

A further object of the invention is to provide a novel overvoltage sensing circuit in which the square knee of high voltage Zener diodes is not critical to circuit performance.

Another object of the invention is to provide a novel overvoltage sensing circuit which is unaffected by repeated minor overvoltage transients.

These and other objects of the invention will become more apparent upon consideration of the following detailed description in connection with the attached drawings, in which.

Figure 1:
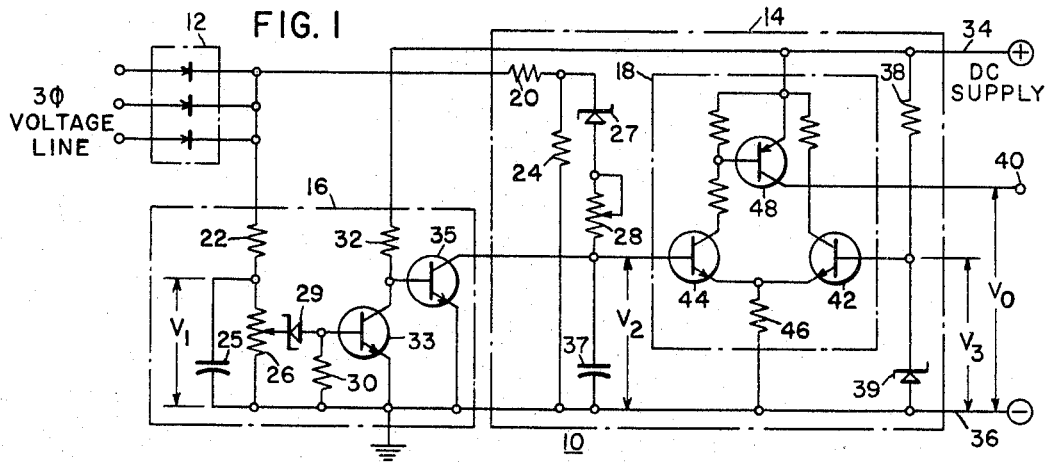
FIGURE 1 is a schematic diagram of an overvoltage sensing and protection circuit arranged in accordance with the principles of the invention.

Specifically, there is shown in FIG. 1 an illustrative embodiment of the invention. FIG. 1 shows an overvoltage sensing and protective circuit 10 energized by rectifier circuit 12 comprising three line voltage rectifiers respectively connected to three-phase voltage lines. The invention however is not limited to use with three-phase systems. The rectified line voltage is applied simultaneously to time delay circuit 14 and sensing circuit 16 through current limiting resistors 20 and 22 respectively and across resistors 24 and 26 respectively. A rectified sensing voltage $V_1$ is filtered by a capacitor 25 and is proportional to the average of the three-phase system line-to-neutral voltages.

The time delay circuit 14 comprises essentially a voltage detector 18 connected between positive and negative terminals 34 and 36 respectively, a Zener diode 27, an adjustable resistor 28 and a timing capacitor 37, the latter three elements being connected in series across the resistor 24 and between the resistor 20 and ground. The time delay circuit is shown further as including a voltage dropping resistor 38 and a Zener diode 39.

The sensing circuit 16 includes the capacitor 25 connected across the resistor 26, a low voltage Zener diode 29, the cathode of which is connected to a center tap on the resistor 26, and two transistors 33 and 35 connected to the positive terminal 34 through a current limiting resistor 32 in a switching manner presently to be explained. The anode of the diode 29 is connected between the base of the first transistor 33 and a base resistor 30.

When the system line voltages are below the overvoltage levels, the voltage across low voltage Zener diode 29 is insufficient to cause its conduction so that no base current is provided to transistor 33; transistor 33 is therefore non-conducting. A suitable direct current supply is provided, as indicated by the positive and negative terminals 34 and 36 with the positive terminal connected to the collector of transistor 33 through current limiting resistor 32. With transistor 33 non-conducting, current flows from the direct current supply through resistor 32 and into the base of a second transistor 35 so that the second transistor is conducting. Therefore, when no overvoltage condition exists, capacitor 37, connected to the collector of second transistor 35, is clamped to ground potential by the conducting transistor 35.

A voltage $V_2$, developed across the capacitor 37, is sensed by voltage detector 18 which may take the form of a miniature integrated circuit unit such as shown and fully described in the above mentioned copending application. Characteristically, detector 18 is a Darlington type differential amplifier that is biased in an off (no output) condition by a reference voltage $V_3$ applied to the base of a transistor 42 forming one half of the differential amplifier. The voltage $V_2$, reflecting a charge on capacitor 37, is applied to the base of a transistor 44 forming the other half of the differential circuit. The voltage $V_3$, applied to the base of the transistor 42, produces a forward base-emitter bias so that the transistor is normally conducting thereby causing a flow of current through and a resulting voltage drop across a resistor 46 commonly connecting the emitters of the two transistors 42, 44 to ground. The voltage drop, in turn, reverse biases the transistor 44 in an off condition. When the level of the $V_2$ voltage becomes sufficient to offset the reverse bias produced across the common emitter resistor, the transistor 44 is switched on thereby providing a path for current flow through a high gain amplifier transistor 48, the base of which is serially connected to the collector of transistor 44. The high gain amplifier is thus switched on to produce an output signal (at a terminal 40) at the D.C. supply voltage level. As long as the voltage level of $V_2$ is less than the voltage level of $V_3$, detector 18 will generate no signal. With no overvoltage condition on the phase lines, $V_2$ is substantially zero as explained above.

A very stable reference voltage $V_3$ (and therefore a very stable voltage detector) is provided by the Zener diode 39 which is temperature stable. Diode 39 is connected between the direct current supply (through voltage dropping resistor 38) and ground so that the desired level of reference voltage is applied to the voltage detector 18.

The tripping of circuit 10 is best described in connection with FIG. 3. When an overvoltage condition occurs at time $t_0$, an increase in sensing voltage $V_1$ results in the conduction of Zener diode 29. Transistor 33 now becomes conductive since current $I_{29}$ through the diode is directly fed to the base of the transistor. The conduction of transistor 33 causes the loss of base current signal to transistor 35 which switches to its non-conducting state, see curve $I_{35}$. Capacitor 37 is now unclamped. The overvoltage condition further causes Zener diode 27 to conduct so that the capacitor 37 is charged from the rectified line voltage by direct current flow through resistor 20, diode 27 and adjustable resistor 28 at a rate proportional to the magnitude of the overvoltage condition. When (time $t_1$) the voltage level $V_2$ on capacitor 37 reaches the level of reference voltage $V_3$ (see dashed line), voltage detector 18 provides an output signal $V_0$ at terminal 40 which is the overvoltage fault signal. Such a signal may be used to deenergize an aircraft generator by removing its field, or it may be used to deenergize the power system by disconnecting the load bus from the generator output leads.

The time period $t_0$ to $t_1$, provided by time delay circuit 14, is adjustable by choosing the setting of the adjustable resistor 28, and its adjustment has no appreciable effect on the sensing circuit 16 since circuit 14 receives the overvoltage signal through its own means. Therefore, no problem of lengthy time delays at minimum level voltage sensing are encountered with novel circuit 10 since the time delay provided by circuit 14 can be changed to operate at any level of the sensing voltage chosen for operation of the sensing circuit 16. Thus circuit 10 can be easily set to meet the 5 second maximum delay time requirement mentioned above without adversely affecting the voltage sensing parameter.

In the event an overvoltage condition occurs as a series of transients that in themselves are insufficient to warrant the production of a fault signal, nuisance tripping of circuit 10 is precluded by the almost instantaneous discharge of timing capacitor 37 by the conduction of clamping transistor 35. This gives circuit 10 an excellent repeatability characteristic not found in previous overvoltage circuits. Heretofore, the timing capacitor had a tendency to accumulate charges representing a series of minor overvoltage transient spikes and Zener diode noise so that the protection circuit would function and the system be needlessly closed down. In circuit 10, the time delay circuit capacitor 37 effectively integrates the overvoltage pulse or spike so that with the rapid rise and fall of minor transient spikes, clamping transistor 35 instantly discharges capacitor 37 by instantly placing it at ground potential with the rapid fall to voltage zero of such transient spikes. This almost instantaneous reset of capacitor 37 provides the excellent repeatability of circuit 10 which in turn and in addition greatly enhances in its reliabilty.

Individual circuit calibration is provided for in the sensing circuit 16 and time delay circuit 14 by potentiometers 26 and 28 respectively. Thus, the time constant of the RC circuit formed by potentiometer 28 and capacitor 37 can be changed without substantially affecting the parameters of the sensing circuit 16 as explained above. Similarly, the adjustment of potentiometer 26 in choosing an overvoltage level for the tripping of circuit 10 has esssentially no effect on time delay circuit 14.

Figure 2:
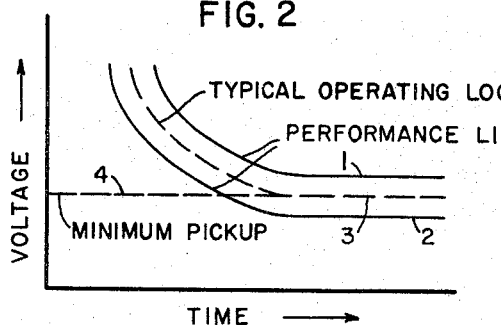
FIG. 2 is a curve showing the volt-time performance characteristic of the circuit of FIG. 1.

FIG. 2 shows the volt-time performance curve of circuit 10. The slope and positioning of the circuits volt-time characteristic (curve 3) is independent of the minimum pickup level (curve 4) as explained above. The volt-time characteristic can further be readily changed to meet changing requirements and protection limits by simple selection of proper values for resistors 20, 24, 28, diodes 27 and 39, and capacitor 37. Such circuit flexibility offers excellent "curve fitting," easier calibration and very effective means for limiting the time delay of circuit 10 actuation at minimum sensing voltages.

Figure 3:
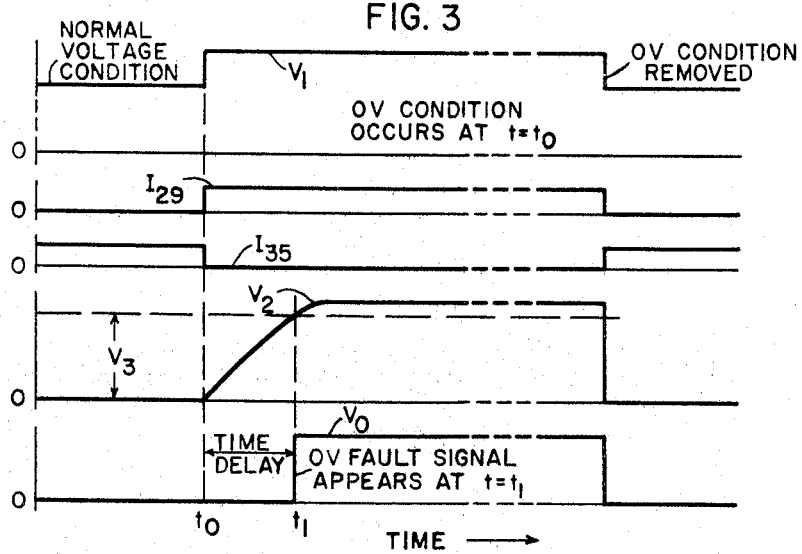
FIG. 3 shows certain voltage wave forms applicable to the circuit of FIG. 1.

The prescribed requirements for limited time delay of circuit tripping at minimum levels of sensing voltage are met by circuit 10 as shown by FIGS. 2 and 3. As shown in FIG. 2 the curve 4 is rapidly approached and intersected by the volt-time slope of curve 3 so that circuit is tripped and the overvoltage fault signal produced within prescribed time limits in a manner explained in connection with FIG. 3. Solid curves 1 and 2 in FIG. 2 define the prescribed limits of circuit performance within which tripping should occur.

It should now be apparent that a new overvoltage circuit has been disclosed which far exceeds presently used circuits in performance, economy and flexibility. By the elimination of the sensing transformer and the use of miniature components a significant degree of circuit miniaturization and weight reduction is realized. Circuit 10 further offers independent voltage sensing and time delay operation enabling improved "curve fitting" (prescribed volt-time performance limits), easier circuit calibration, and limiting of the time delay at minimum voltage sensing levels. In addition, nuisance tripping by a succession of minor overvoltage transients is precluded by the fast time delay reset provided by the clamping means. Further, a high degree of accuracy and temperature stability is achieved by the use of voltage detector 18 and a temperature stabilized Zener diode reference voltage. The problem of diode noise and field effect associated with the conduction of high voltage Zeners is not found in circuit 10 since Zener diode 29 is a low voltage device and Zener diode 27 is not operated in the critical area of its square knee. In all, the unique circuit arrangement disclosed herein provides advantages in size and performance heretofore unavailable in the prior art.

Though the invention has been described with a certain degree of particularity it should be apparent that modifications and other embodiments are possible within the spirit and scope of the invention. For example, integrated circuit voltage detector 18 may be replaced by the use of discrete components or it may be replaced by a simple transistor amplifier circuit in combination with time delay capacitor 37 connected to the base thereof through a Zener diode. Therefore, the invention is not limited to the particular details and circuit connections illustrated, but includes in its broadest aspects all equivalent embodiments and modifications.

What is claimed is:

1. A solid state circuit arrangement for sensing an overvoltage condition comprising a voltage sensing circuit and a time delay circuit, means for separately and simultaneously applying the voltage to be sensed directly to said sensing and time delay circuits, a timing capacitor connected in said time delay circuit to be charged by said voltage, said sensing circuit including a clamping circuit connected to the capacitor for clamping said capacitor to ground potential when the voltage being sensed does not exceed a predetermined value, said clamping circuit being operative to unclamp the capacitor when the voltage exceeds said predetermined value, a voltage detector connected to said capacitor and adapted to produce an output signal when the charge on the capacitor reaches a predetermined level, and separate, adjustable resistance means connected respectively in said sensing and time delay circuits for separately adjusting said circuits independently of each other.

References Cited

UNITED STATES PATENTS

| | | | |
|---|---|---|---|
| 2,885,569 | 5/1959 | Schuh et al. | 317—31 X |
| 3,001,100 | 9/1961 | Schuh et al. | 317—31 |
| 3,119,951 | 1/1964 | Davy | 317—49 X |
| 3,214,641 | 10/1965 | Sonnemann | 317—36 |
| 3,243,658 | 3/1966 | Blackburn | 317—31 |
| 3,309,583 | 3/1967 | Knapp-Ziller et al. | 317—31 X |

LEE T. HIX, Primary Examiner

J. D. TRAMMELL, Assistant Examiner

U.S. Cl. X.R.

317—33, 36, 49